United States Patent [19]

Wilson et al.

[11] Patent Number: 5,190,642
[45] Date of Patent: Mar. 2, 1993

[54] HYDROCONVERSION CATALYST

[75] Inventors: Charles R. Wilson, San Francisco; Kirk R. Gibson, El Cerrito; Chi-Wen Hung, San Rafael, all of Calif.

[73] Assignee: Chevron Research and Technology Company, San Francisco, Calif.

[21] Appl. No.: 791,216

[22] Filed: Nov. 13, 1991

Related U.S. Application Data

[62] Division of Ser. No. 543,005, Jun. 25, 1990, Pat. No. 5,089,453.

[51] Int. Cl.$^5$ .............. C10G 45/04; C10G 45/06; C10G 45/08
[52] U.S. Cl. ................. 208/254 R; 208/254 H
[58] Field of Search ............... 208/254 R, 254 H

[56] References Cited

U.S. PATENT DOCUMENTS

| | | | |
|---|---|---|---|
| 3,205,165 | 9/1965 | Hilfman | 208/254 |
| 3,401,125 | 9/1968 | Jaffe | 208/111 |
| 3,840,473 | 10/1974 | Beuther | 208/216 R |
| 3,897,365 | 7/1975 | Feins et al. | 208/216 R |
| 4,444,655 | 4/1984 | Shiroto et al. | 208/210 |
| 4,465,790 | 8/1984 | Quayle | 502/309 |
| 4,490,483 | 12/1984 | Vogel et al. | 502/309 |

Primary Examiner—Theodore Morris
Assistant Examiner—Zeinab El-Arini
Attorney, Agent, or Firm—Burns, Doane, Swecker & Mathis

[57] ABSTRACT

A method of making a hydrotreating catalyst wherein the catalyst is prepared by mixing a peptized alumina support containing soluble Group IVB and Group VIII metal compounds with a solution containing a soluble Group VIB metal compound and a basic compound. The catalyst is used for hydrodenitrogenation and Ramsbottom Carbon Residue reduction of a hydrocarbon feedstock.

15 Claims, No Drawings

HYDROCONVERSION CATALYST

This application is a divisional of U.S. application Ser. No. 07/543,005 filed Jun. 25, 1900, now is U.S. Pat. No. 5,089,453.

BACKGROUND OF THE INVENTION

This invention relates to hydrotreating of hydrocarbon feedstocks and more particularly to catalytic treatment of hydrocarbon feedstocks to effect removal of nitrogen and sulfur, and to reduce Ramsbottom Carbon Residue (RCR). This invention is especially directed toward the preparation of a catalytic composition having excellent hydrotreating activity for the removal of nitrogen and reduction of Ramsbottom Carbon Residue in heavy hydrocarbon stocks. Examples of such heavy stocks are total crude oil, crude residue, atmospheric and vacuum gas oils, cycle oils and lube oils.

Crude petroleum oil, and heavy hydrocarbon fractions and/or distillates derived from crudes, contain components such as nitrogen, sulfur and metals. These impurities may exist in heteratomic compounds and are often present in relatively large quantities. Such impurities may poison or modify catalysts used in the upgrading of petroleum fractions in reforming or cracking steps. Nitrogen and sulfur are also objectionable because combustion of hydrocarbon fuels containing these impurities releases nitrogen and sulfur oxides. Such byproduct gases are noxious, corrosive and present a serious problem in the field of air pollution.

The removal and/or conversion of these impurities is effectively carried out by catalytic hydrotreating, where a feedstock containing sulfur and nitrogen is contacted with a supported catalyst in the presence of hydrogen. Hydrotreating conditions may include a wide range of temperatures, pressures and space velocities as determined by the design of commercial refineries.

Supported catalysts can be generally characterized as comprising metallic components, supported on a refractory inorganic oxide carrier of synthetic or natural origin and having a medium to high surface area (typically greater than 50 m$^2$/g) and a well-developed pore structure. Metallic components having hydrotreating activity may include the metals of Groups VIB and VIII of the Periodic Table. The "Periodic Table" as herein referred to appears in the 62nd Edition of the Handbook of Chemistry and Physics, CRC Press Inc., Boca Raton, Fla. (1981).

Group IVB metal components (for example, titanium) can be incorporated into the catalyst as a promoter to increase the activity of the catalyst. Phosphorous components are commonly incorporated into the catalyst to improve its activity by increasing its acidity; however, the prior art (U.S. Pat. No. 3,840,473) has taught that when the presence of phosphorous is greater than about 0.5% by weight in a titanium-containing catalyst, phosphorous is detrimental to the activity of the catalyst.

Numerous disclosures have been made directed to methods for preparing supported catalyst for hydrotreating. Catalytic metals may be applied to a formed or unformed carrier by several methods known in the art which include co-precipitation of the support with active metals and promoter (also known as the co-gell method), co-mulling the active metals and promoter into a peptized alumina substrate and by various impregnation procedures.

U.S. Pat. No. 3,401,125 discloses co-precipitation of the support with active metals including Group IVB to give an active catalyst similar in hydrodenitrogenation activity to the catalyst of the instant invention; however, this method requires washing steps that are expensive, and the metals, particularly the molybdenum, may be partially washed off the catalyst.

U.S. Pat. No. 4,465,790 discloses a hydrodenitrogenation catalyst which utilizes catalyst supports of alumina-titania prepared by a process starting with co-precipitation of the metals as a hydrogel from a solution of the sulfates of aluminum and titanium. The hydrogel is washed and dried and the resulting powder is mulled with acid and water to make an extrudable paste. The paste is extruded and the extrudates redried and calcined to finish the catalyst support. The calcined support is impregnated with a solution of the catalytic metal salts, then dried and calcined again to produce the finished catalyst. Similar to the co-precipitation methods disclosed in U.S. Pat. No. 3,401,125 the method of this patent includes washing steps which are expensive, and further, includes at least two calcining steps.

U.S. Pat. No. 3,997,431 teaches a hydrodesulfurization process using a catalyst substantially free of phosphates and consisting essentially of hydrogenating Group VIB and Group VIII metals, both hydrogenating metals being in the sulfided form, supported on a non-zeolitic refractory oxide carrier and promoted with a Group IVB metal such as titanium. The titanium may be added to the carrier simultaneously with the Group VIB and Group VIII metals and preferably after the calcination of the carrier.

U.S. Pat. No. 4,443,558 teaches a method for making a catalyst comprising alumina with Group VIB and VIII metal components wherein the method comprises peptizing alumina powder with an aqueous acidic solution of a Group VIII metal salt, neutralizing the peptized alumina/Group VIII metal with an aqueous solution of a nitrogen-containing base with a dissolved Group VIB metal salt therein, extruding, drying and calcining the catalytic particles.

While catalyst prepared according to this method show good hydroprocessing activity, there is a problem in preparing catalyst in a reproducible manner. Pore size distribution of the catalyst base vary significantly and agglomeration of the catalytic metals such as nickel and molybdenum occurs on the surface of the catalyst.

U.S. Pat. No. 4,444,655 discloses the use of a hydrotreating catalyst in a process for hydrotreating a heavy hydrocarbon oil containing asphaltenes. The hydrotreating catalyst utilizes inorganic oxides selected from Groups II, III and IV of the Periodic Table. The catalytic metal components are selected from metals belonging to Groups VB, VIB, VIII and IB of the Periodic Table.

The catalyst of the '655 patent has an average pore diameter between 180 angstroms to about 500 angstroms, with total volume of such pores being larger than about 0.2 cc/g.

SUMMARY OF THE INVENTION

In accordance with the present invention, there is provided a method for making a hydrotreating catalyst which comprises: (a) peptizing alumina with an aqueous acidic solution containing a soluble Group IVB metal compound and a soluble Group VIII metal compound;

(b) neutralizing said aqueous acidic solution containing the peptized alumina with an aqueous solution containing a basic compound and a soluble Group VIB metal compound while mulling; and (c) shaping, drying and calcining the catalyst particles, and the use of a catalyst so prepared in a process for removing nitrogen from a nitrogen-containing hydrocarbon feed. The denitrogenation process comprises contacting the hydrocarbon stream under hydrodenitrogenation conditions and in the presence of hydrogen with the aforesaid catalyst.

Hydrodenitrogenating in accordance with the present invention results not only in substantial nitrogen removal, but also results in substantial RCR reduction of the feedstock, and sulfur removal.

Thus, among other factors, the present invention is based on our discovery that the use of a water soluble Group IVB metal compound, preferably a titanium compound, when incorporated into the catalyst according to the method of this invention, not only acts as a promoter for increasing hydrodenitrogenation activity of the catalytic metal, i.e., the Group VIB and Group VIII metal components, present in the catalyst, but also aids in obtaining a more even pore size distribution within the catalyst base or matrix and prevents agglomeration of the Group VIB and Group VIII catalytic metal components on the surface of catalyst. For these reasons, the catalyst and method of preparation of the catalyst of this invention is an improvement over the catalyst disclosed in U.S. Pat. No. 4,443,558.

DETAILED DESCRIPTION OF THE INVENTION

A method is provided for making a catalyst wherein an aqueous acidic solution of pH less than 3 is used to peptize alumina. The aqueous acidic solution which is used to peptize the alumina contains a soluble Group IVB metal compound and a soluble Group VIII metal compound. The Group IVB metal compounds which are used in this method include titanium, zirconium and hafnium compounds, with titanium compounds preferred. The most preferred type of titanium compounds include titanium trichloride, titanium tetrachloride or other titanium halides. The preferred Group VIII metal compounds used in the method of our invention include nickel and cobalt compounds. The most preferred nickel compounds include nickel acetate, nickel nitrate, nickel sulfate, nickel oxide, nickel chloride, nickel carbonate and nickel hydroxide.

The aqueous acidic solution containing the peptized alumina is neutralized with an aqueous solution containing a basic compound and a soluble Group VIB metal compound while mulling. The preferred basic compound which may be used in the method of our invention is ammonium hydroxide. Preferred Group VIB metal compounds which may be used include molybdenum and tungsten. The most preferred molybdenum compounds include ammonium molybdate, ammonium compounds of molybdenum oxides, molybdenum oxides and their aqueous or hydrogen peroxide solutions.

It is preferable to use metal compounds which are readily soluble in appropriate solutions. Readily soluble metal compounds are not necessarily totally dissolved in the appropriate solution.

In another embodiment, the method of the present invention for making a catalyst comprises peptizing alumina with an aqueous acidic solution containing a soluble Group IVB metal compound and then adding a Group VIII metal compound which is soluble in said aqueous acidic solution. The acidic mixture containing the peptized alumina is then neutralized with a solution containing a basic compound and a soluble Group VIB metal compound while mixing. Catalyst particles can be obtained by shaping, drying and calcining.

TABLE I

| Metal Component | Broad, wt. % | Preferred, wt. % |
| --- | --- | --- |
| Ti | 0.5–10.0 | 2.5–6.5 |
| Zr | 1.0–20.0 | 4.5–12.5 |
| Hf | 2.0–40.0 | 9.0–24.0 |
| Ni | 1.0–15.0 | 5.0–10.0 |
| Co | 1.0–15.0 | 5.0–10.0 |
| Mo | 5.0–25.0 | 10.0–20.0 |
| W | 10.0–50.0 | 20.0–40.0 |

The catalyst particles are shaped, dried and calcined. The catalyst may be further impregnated using standard impregnating procedures and compounds such as phosphoric acids, ammonium phosphate salts and heteropolyphosphomolybdic acid upon such further impregnation with a phosphorous compound, the catalyst particles are preferably characterized by a phosphorous content of from about 0.5 weight % to about 5.0 weight percent.

The catalyst of this invention has a pore volume falling within a range of 0.30–0.60 cc/g and pore size distribution peaks falling within a range of 50–100 angstroms. The pore size distributions are relatively narrow with at least 50% of the total pore volume contained in pores with diameters falling within 20 angstroms of the peak.

Preferably, the catalyst of this invention has a pore volume falling within a range of 0.37–0.52 cc/g and pore size distribution peaks falling within a range of 60–90 angstroms. The pore size distributions are relatively narrow with at least 60% of the total pore volume contained in pores with diameters falling within 20 angstroms of the peak.

The catalyst made by the method of the present invention can be used for hydroprocessing, e.g., hydrotreating, hydrocracking or the like. According to one preferred embodiment of the present invention, the present catalyst is used in a hydrotreating process to reduce the nitrogen and sulfur content and RCR. Suitable hydrotreating feedstocks include any hydrocarbon feedstock containing nitrogen with a boiling point greater than 500° F. This includes unprocessed and partially hydrodemetallized vacuum and atmospheric residua and crude deasphalted oil, vacuum gas oil, heavy crude oils, and lube oils.

These feedstocks can be passed over the catalyst of the present invention at a liquid hourly space velocity in a reactor of about 0.05 to about 5.0, preferably from about 0.1 to about 3.0, while maintaining the reaction zone at a temperature of from 500° F. to about 850° F., preferably from about 550° F. to about 800° F., while under a total pressure of about 450 to about 3500 pounds per square inch gauge, preferably from about 600 to about 2800 pounds per square inch gauge, and a hydrogen partial pressure of from about 350 to about 3200 pounds per square inch gauge, preferably from about 500 to about 2500 pounds per square inch gauge.

Examples 1 and 2 illustrate how to make the catalyst of our invention.

Examples 3 through 5 illustrate the different methods which can be used to prepare various hydrotreating catalysts. These catalysts contain a titania-alumina inorganic oxide support and nickel and molybdenum hydrogenation components.

EXAMPLE 1

A catalyst was prepared as follows: 177 gms of $TiCl_4$ were added slowly to 600 gms of ice while stirring until the solution cleared. 400 gms $Ni(C_2H_3O_2)_2 \cdot 4H_2O$ (nickel acetate tetrahydrate) were then slowly added with stirring until the resulting solution cleared. The pH of the solution was 1.5. This solution was labeled "1A".

A molybdenum solution was prepared by stirring and filtering a mixture composed of 26.5 wt. % concentrated aqueous $NH_4OH$, 28.9 wt. % $MoO_3$, balance deionized water. 100 cc concentrated aqueous $NH_4OH$ were mixed with 753 cc of the molybdenum solution. The resultant solution was labeled "1B".

1000 gms of pseudo boehmite alumina powder (760 gms dry-basis $Al_2O_3$) was charged to a sigma-blade mixer. Solution 1A was then added. After 20 minutes, Solution 1B was added while mixing. Mixing was continued for 20 additional minutes.

The wet mix was extruded. The extrudates were dried and calcined at 1150° F. for 2 hours with flowing dry air.

EXAMPLE 2

A catalyst was made as demonstrated in Example 1 by substituting an equimolar amount of $TiCl_3$ for $TiCl_4$.

EXAMPLE 3

A comparative catalyst was prepared using $Ti(OH)_4$ in place of $TiCl_4$.

286.5 gms $Ti(OH)_4$, a water soluble titanium, such as commercially available titanium hydrolysate, were mixed with 300 gms of deionized water. 400 gms $Ni(C_2H_3O_2)_2 \cdot 4H_2O$ [nickel acetate tetrahydrate] were then slowly added with continued stirring. This mixture was labeled "3A".

108.6 gms nitric acid (70% $HNO_3$) were added to 200 gms of deionized water. This solution was labeled "3B".

A molybdenum solution was prepared by stirring and filtering a mixture composed of 26.5 wt. % concentrated aqueous $NH_4OH$, 28.9 wt. % $MoO_3$, balance deionized water. 100 cc concentrated aqueous $NH_4OH$ were mixed with 753 cc of the molybdenum solution. The resultant solution was labeled "3C".

1000 gms of pseudo boehmite alumina powder (760 gms dry-basis $Al_2O_3$) was charged to a sigma-blade mixer. Solution 3B was added while mixing. After 10 minutes, Mixture 3A was added while mixing. After 10 minutes of mixing, Solution 3C was then added and the mixing was continued for an additional 20 minutes.

The wet mix was extruded, dried and calcined at 1150° F. for 2 hours with flowing dry air to give the final calcined catalyst.

EXAMPLE 4

A comparative catalyst was prepared using finely divided solid $TiO_2$ in place of $TiCl_4$.

108.6 gms of nitric acid (70% $HNO_3$) were diluted with 200 gms of deionized water. 400 gms of $Ni(C_2H_3O_2)_2 \cdot 4H_2O$ [nickel acetate tetrahydrate] were then dissolved. This solution was labeled "4A".

85.2 gms of $(TiO_2)$ [anatase titania] were stirred in 199 gms of deionized water. This slurry was labeled "4B".

A molybdenum solution was prepared by stirring and filtering a mixture composed of 26.5 wt. % concentrated aqueous $NH_4OH$, 28.9 wt. % $MoO_3$, balance deionized water. 100 cc concentrated aqueous $NH_4OH$ were mixed with 753 cc of the molybdenum solution. The resultant solution was labeled "4C".

1000 gms of pseudo boehmite alumina powder (760 gms dry-basis $Al_2O_3$) was charged to a sigma-blade mixer. Solution 4A was added while mixing. Slurry 4B was added while mixing. After an additional 10 minutes of mixing, Solution 4C was added with mixing and the mixture was stirred for an additional 20 minutes.

The wet mix was extruded, dried and calcined at 950° F. for 1 hour with flowing dry air to give the final calcined catalyst.

EXAMPLE 5

A comparative catalyst was prepared from co-precipitated titania-alumina powder.

35 gms of nitric acid (70% $HNO_3$) were diluted with 35 cc of deionized water. The solution was labeled "5A".

304 gms of nickel nitrate $[Ni(NO_3)_2 \cdot 6H_2O]$ were dissolved in 375 cc deionized water. Then Solution 5A was added. This solution was labeled "5B".

A molybdenum solution was prepared by stirring and filtering a mixture composed of 26.5 wt. % concentrated aqueous $NH_4OH$, 28.9 wt. % $MoO_3$, balance deionized water 16.8 cc concentrated aqueous $NH_4OH$ was mixed with 515 cc of the molybdenum solution. 35 cc deionized water were added. This solution was labeled "5C".

700 gms of a commercially available 10%/90% $TiO_2/Al_2O_3$ powder were mixed in a sigma-blade mixer. Solution 5B was added with mixing. Mixing was continued for an additional 20 minutes.

Solution 5C was then added and mixing was continued for an additional 20 minutes.

The wet mix was extruded, dried and calcined at 950° F. for 1 hour with flowing dry air to give the final calcined catalyst.

EXAMPLE 6

In this example, the catalysts of Examples 1 and 2 are contrasted with the comparative catalysts of Examples 3-5 and two commercial residuum hydroprocessing catalysts under hydrotreating conditions. The feed used in this comparison was an Alaska North Slope straight run vacuum residuum having the properties shown in Table II.

TABLE II

| Gravity, °API | 7.0 |
|---|---|
| Sulfur, wt. % | 2.29 |
| Nitrogen, wt. % | 0.78 |
| Oxygen, wt. % | 0.51 |
| Ramsbottom Carbon, wt. % | 17.9 |
| Micro-carbon Residue, wt. % | 17.9 |
| Asphaltenes, wt. % | 3.21 |
| Ni/V/Fe, ppm | 36/76/3 |
| D1160 Distillation, vol. % | |
| St/5 | 922/1012° F. |
| 10/20 | 1017/1047° F. |

An alternative way of measuring Ramsbottom Carbon is using ASTM D4530-85. The number obtained is referred to as Micro-carbon Residue.

The hydrotreating conditions used for this example are listed in Table III:

TABLE III

| Total pressure, psig | 2000 |
|---|---|
| Feed rate (LHSV), hr.$^{-1}$ | 0.5 |

TABLE III-continued

| Hydrogen/hydrocarbon feed rate, scf/bbl | 5000 |
| --- | --- |

The catalysts were activated by a pre-sulfiding step before contact with the hydrocarbon feed.

The catalysts of Examples 1–5 were compared for residuum conversion by running to constant sulfur removal (HDS), while monitoring nitrogen removal (HDN) and micro-carbon residue (MCR) removal. The measure of catalyst performance was the normalized catalyst temperature required to meet target product properties. Table IV compares the performance of the catalysts of this invention (Examples 1 and 2) with the comparative catalysts of Examples 3–5, and with comparative commercial nickel, molybdenum, phosphorous, alumina residuum processing catalysts (catalysts A, B).

In this test, a good catalyst deactivates rapidly for 300–400 hours before lining out at a lower deactivation rate. To compare these catalysts, we compared normalized activities at 600 hours. However, if a catalyst is fouling very rapidly with obviously poor activity, we sometimes stop the test before 600 hours. Table IV contains data at 600 hours for those tests which ran that long and for shorter periods for tests which were stopped early.

TABLE IV

| | Ex 1 (TiCl₄) | | Ex 2 (TiCl₃) | | Ex 3 | Ex 4 | Ex 5 | Cat. A | Cat. B |
| --- | --- | --- | --- | --- | --- | --- | --- | --- | --- |
| Run Hours | 300 | 600 | 300 | 600 | 600 | 300 | 600 | 400 | 250 |
| Normalized Catalyst Temp. °F. | | | | | | | | | |
| HDS | 729 | 739 | 730 | 742 | 766 | 749 | 770 | 755 | 768 |
| MCR | 731 | 737 | 730 | 738 | 751 | 736 | 776 | 768 | 765 |
| HDN | 732 | 741 | 728 | 739 | 756 | 749 | 779 | 765 | — |

What is claimed is:

1. A method for the hydrodenitrogenation of a hydrocarbon feed containing a substantial amount of nitrogen compounds, which method comprises contacting said feed in a reaction zone under hydrodenitrogenation conditions comprising a temperature within the range of about 500° F. to about 850° F., a total pressure within the range of about 450 to about 3500 pounds per square inch gauge, a liquid hourly space velocity ranging from about 0.05 to about 5.0 (hr⁻¹), and a hydrogen partial pressure ranging from about 350 to about 3200 pounds per square inch gauge, in the presence of hydrogen and with a catalyst prepared by the method comprising:
   (a) peptizing alumina with an aqueous acidic solution containing a soluble Group IVB metal compound, and a soluble Group VIII metal compound;
   (b) neutralizing said aqueous acidic solution containing the peptized alumina with an aqueous solution containing a basic compound and a soluble Group VIB metal compound while mulling; and
   (c) shaping, drying and calcining the catalyst particles; and
   collecting an effluent with reduced nitrogen levels.

2. A method for the hydrodenitrogenation of a hydrocarbon feed containing a substantial amount of nitrogen compounds, which method comprises contacting said feed in a reaction zone under hydrodenitrogenation conditions comprising a temperature within the range of about 500° F. to about 850° F., a total pressure within the range of about 450 to about 3500 pounds per square inch gauge, a liquid hourly space velocity ranging from about 0.05 to about 5.0 (hr⁻¹), and a hydrogen partial pressure ranging from about 350 to about 3200 pounds per square inch gauge, in the presence of hydrogen and with a catalyst prepared by the method comprising:
   (a) peptizing alumina with an aqueous acidic solution containing a soluble Group IVB metal compound;
   (b) adding a Group VIII metal compound which is soluble in said aqueous acidic solution;
   (c) neutralizing said aqueous acidic mixture containing the peptized alumina with a basic compound;
   (d) adding a soluble Group VIB metal compound while mixing; and
   (e) shaping, drying, and calcining the catalyst particles; and
   collecting an effluent with reduced nitrogen levels.

3. The method of claim 1 or 2 wherein said aqueous acidic solution contains an acid selected from the group consisting of nitric acid, sulfuric acid, formic acid, acetic acid, oxalic acid and hydrochloric acid.

4. The method of claim 1 or 2 wherein the pH of the aqueous acidic solution is less than 3.

5. The method of claim 1 or 2 wherein Group VIII metal compound contains nickel.

6. The method of claim 5 wherein said Group VIII metal compound is selected from the group consisting of nickel acetate, nickel nitrate, nickel sulfate, nickel oxide, nickel chloride, nickel hydroxide, nickel carbonate and mixtures thereof.

7. The method of claim 1 or 2 wherein said Group VIB metal compound contains molybdenum.

8. The method of claim 7 wherein said Group VIB metal compound is selected from the group consisting of ammonium molybdate, ammonium compounds of molybdenum oxides, molybdenum oxides and their hydrogen peroxide solutions.

9. A method for the hydrodenitrogenation of a hydrocarbon feed containing a substantial amount of nitrogen compounds, which method comprises contacting said feed in a reaction zone under hydrodenitrogenation conditions comprising a temperature within the range of about 500° F. to about 850° F., a total pressure within the range of about 450 to about 3,500 pounds per square inch gauge, a liquid hourly space velocity ranging from about 0.05 to about 5.0 (hr.⁻¹), and a hydrogen partial pressure ranging from about 350 to about 3200 pounds per square inch gauge, in the presence of hydrogen and with a catalyst prepared by the method comprising:
   (a) a peptizing alumina with an aqueous acidic solution having a pH of less than 3, containing a soluble titanium compound and a soluble nickel compound;
   (b) neutralizing said peptized alumina with an aqueous solution of a nitrogen containing base having a soluble molybdenum compound dissolved therein; and
   (c) shaping, drying and calcining the catalyst particles; and
   collecting an effluent with reduced nitrogen levels.

10. The method of claim 9 wherein the titanium compound is selected from the group consisting of titanium tetrachloride and titanium trichloride.

11. The method of claim 1, 2, or 9 wherein the catalyst particles, after calcining, are impregnated with a phosphorous-containing compound.

12. The method of claim 11 wherein said phosphorous-containing compound is selected from the group consisting of phosphoric acid, ammonium phosphate, and phosphomolybdic acid.

13. The method of claim 1, 2 or 9 wherein said conditions comprise a temperature within the range of about 550° F. to about 800° F.; a total pressure within the range of range of about 600 to about 2800 pounds per square inch gauge; a liquid hourly space velocity ranging from about 0.1 to about 3.0 (hr.$^{-1}$); and a hydrogen partial pressure ranging from about 500 to about 2500 pounds per square inch gauge.

14. The method of claim 1, 2 or 9 which further reduces the Ramsbottom Carbon Residue of the hydrocarbon feed.

15. The method of claim 1, 2 or 9 which further reduces the sulfur content of the hydrocarbon feed.

* * * * *